United States Patent [19]

Kurokami

[11] Patent Number: 5,535,248
[45] Date of Patent: Jul. 9, 1996

[54] DIGITAL RADIO COMMUNICATION SYSTEM

[75] Inventor: Yuzo Kurokami, Tokyo, Japan

[73] Assignee: NEC Corporation, Tokyo, Japan

[21] Appl. No.: 363,313

[22] Filed: Dec. 23, 1994

[30] Foreign Application Priority Data

Dec. 28, 1993 [JP] Japan .................................. 5-334261

[51] Int. Cl.⁶ .............................. H04L 27/06; H04L 1/02; H03H 7/30
[52] U.S. Cl. .......................... 375/324; 375/233; 375/235; 375/347; 455/135; 455/277.2; 329/320; 329/353
[58] Field of Search .................................... 375/233, 235, 375/267, 347, 324; 455/133–136, 277.1, 277.2; 364/724.16, 724.19, 724.2; 329/319–320, 349–350, 353

[56] References Cited

U.S. PATENT DOCUMENTS

| | | | |
|---|---|---|---|
| 4,663,768 | 5/1987 | Ryu | 375/347 |
| 4,752,969 | 6/1988 | Rilling | 455/278 |
| 4,756,023 | 7/1988 | Kojima | 455/134 |
| 5,203,027 | 4/1993 | Nounin et al. | 455/134 |
| 5,379,324 | 1/1995 | Mueller et al. | 375/347 |

FOREIGN PATENT DOCUMENTS

| | | | |
|---|---|---|---|
| 0173927 | 7/1989 | Japan | 455/135 |
| 0276320 | 11/1990 | Japan | 455/135 |
| 0079130 | 4/1991 | Japan | 455/136 |
| 4-130829 | 5/1992 | Japan | 455/277.2 |
| 6-077867 | 3/1994 | Japan | 455/277.2 |

OTHER PUBLICATIONS

John G. Proakis, "Digital Communications", McGraw–Hill Book Company, New York, 1983, pp. 382–387.

*Primary Examiner*—Young T. Tse
*Attorney, Agent, or Firm*—Sughrue, Mion, Zinn, Macpeak & Seas

[57] ABSTRACT

A digital radio communication system includes a first demodulator, a second demodulator, a non-break switch, and a switching controller. The first demodulator receives a signal from a first antenna and outputs demodulated data and a line quality degradation signal. The second demodulator receives a signal from a second antenna and outputs demodulated data and a line quality degradation signal. The non-break switch receives the demodulated data output from the first and second demodulators and selects and outputs one of the demodulated data. The switching controller receives line quality degradation signals output from the first and second demodulators to output a switching control signal to the non-break switch on the basis of the received line quality degradation signals. The first and second demodulators output the line quality degradation signals before the demodulated data are set in an interrupt state when abrupt frequency selective fading occurs.

6 Claims, 5 Drawing Sheets

DIGITAL RADIO COMMUNICATION SYSTEM

BACKGROUND OF THE INVENTION

The present invention relates to a digital radio communication system and, more particularly, to a demodulator of the digital radio communication system.

A digital radio communication system has a factor such as fading which degrades line quality. In order to remedy the system from such line quality degradation, in addition to a current line, a spare line is arranged.

FIG. 4 shows a digital radio communication system having a current line and a spare line.

A signal on the current line is input to an antenna 31a, and then frequency-converted to an IF (intermediate frequency) band by a receiver 32a. The signal is demodulated and subjected to signal equalization, error correction, and the like by a demodulator 33a. The resultant data becomes a current data signal 36a, and is output to a non-break switch 34. Similarly, a signal on the spare line passes through an antenna 31b, a receiver 32b, and a demodulator 33b. The resultant signal becomes a spare data signal 36b, and is output to the non-break switch 34.

Line quality degradation signals 38a and 38b are output from the demodulators 33a and 33b, and these signal are input to a switching controller 35. A switching control signal 37 is output from the switching controller 35, and this signal is input to the non-break switch 34.

The switching controller 35 receives the line quality degradation signals 38a and 38b to monitor line quality. When the switching controller 35 receives neither the line quality degradation signals 38a and 38b, the switching control signal 37 controls the non-break switch 34 to cause the non-break switch 34 to select the current data signal 36a. As a result, the non-break switch 34 outputs the current data signal 36a as transmitted data.

However, when the switching controller 35 receives the line quality degradation signal 38a from the demodulator 33a, the switching control signal 37 output at this time controls the non-break switch 34 to switch the current data signal 36a to the spare data signal 36b and output the spare data signal 36b. When the line quality degradation signal 38a is not input to the switching controller 35, the non-break switch 34 switches the spare data signal 36b to the current data signal 36a, thereby setting the original state.

Note that, when the line quality degradation signal 38b is output from the demodulator 33b, the above switching operation is not performed, and the non-break switch 34 is controlled to keep outputting the current data signal 36a.

FIG. 5 shows a demodulator used in a conventional digital radio communication system. The demodulator is constituted by a demodulation circuit 11, a signal processing circuit 12, and a decision equalizer 13.

The demodulation circuit 11 receives an intermediate-frequency signal input to an input terminal 1 to demodulate the intermediate-frequency signal to a baseband range and A/D-convert the intermediate-frequency signal, thereby outputting a digital signal.

The decision equalizer 13 uses a transversal filter to equalize an inter-code interference component contained in the digital signal input to the demodulation circuit 11, and the equalized signal is determined and then output as a determination signal 61.

The signal processing circuit 12 receives the determination signal 61 to establish frame synchronization, insert and extract a redundancy bit, perform error correction, and the like. The signal processing circuit 12 reproduces and outputs a data signal transmitted from the transmitting side. The reproduced data signal is output from an output terminal 2.

In an error correction process in the signal processing circuit 12, syndrome or parity pulses corresponding to the number of errors of the data signal are generated. These pulses are counted to estimate the number of errors occurring on a line. When the number of errors becomes larger than a predetermined error rate, an error rate alarm signal is output as a line quality degradation signal. This signal is output from an alarm output terminal 3.

The decision equalizer 13 will be described below in detail.

The decision equalizer 13 is constituted by a forward tap 14, a central tap 15, a backward tap 16, an adder 17 for adding outputs from the taps to each other, a main signal determination circuit 18 which receives an equalized signal output from the adder 17 to output the determination signal 61, and a subtracter 19 which receives the equalized signal and the determination signal 61 to output an error signal 62 (E) representing a difference between these signals.

The forward tap 14 is constituted by a multiplier 27a, a multiplier 28a, an integrator 29a, and a delay circuit 30a. The digital signal output from the demodulation circuit 11 is input to the forward tap 14, input to the central tap 15 through the delay circuit 30a, and input to the multipliers 27a and 28a. The multiplier 27a calculates the product between the digital signal and the error signal 62, and the product is integrated by the integrator 29a, thereby generating a forward tap coefficient serving as the correlation value of both the signals. The product between the forward tap coefficient and the digital signal is calculated by the multiplier 28a. In this manner, the digital signal which is not equalized is weighted by the forward tap coefficient to form a forward equalization signal, and this signal is output to the adder 17.

The central tap 15 is constituted by a multiplier 27b, a multiplier 28b, and an integrator 29b. A delay signal input to the central tap 15 through the delay circuit 30a is input to the multipliers 27b and 28b. The multiplier 27b calculates the product between the delay signal and the error signal 62, and this product is integrated by the integrator 29b, thereby generating a central tap coefficient serving as the correlation value between both the signals. The product between the central tap coefficient and the delay signal is calculated by the multiplier 28b. In this manner, the digital signal which is not equalized is weighted by the central tap coefficient to form a central equalization signal, and this signal is output to the adder 17.

The backward tap 16 is constituted by a multiplier 27c, a multiplier 28c, an integrator 29c, and a delay circuit 30b. The determination signal 61 output from the main signal determination circuit 18 is input to the backward tap 16 and input to the multipliers 27c and 28c through the delay circuit 30b. The multiplier 27c calculates the product between the delay determination signal and the error signal 62, and this product is integrated by the integrator 29c, thereby generating a backward tap coefficient serving as the correlation value between both the signals. The product between the backward tap coefficient and the delay determination signal is calculated by the multiplier 28c. In this manner, the delay determination signal is weighted by the backward tap coefficient to form a backward equalization signal, and this signal is output to the adder 17.

The adder 17 receives the forward equalization signal, the central equalization signal, and the backward equalization signal and adds them to each other, thereby outputting an equalized signal from which an inter-code interference component contained in an input to the decision equalizer 13 is removed.

The main signal determination circuit 18 receives the equalized signal output from the adder 17 and compares the equalized signal with a transmitted signal with respect to a signal point to estimate the most reliable value, and the main signal determination circuit 18 outputs the signal having the most reliable value as the determination signal 61.

The subtracter 19 subtracts the determination signal 61 from the equalized signal output from the adder 17 to calculate a difference therebetween, and the subtracter 19 outputs the error signal 62 serving as an equalization residue of the difference.

The operation of the demodulator in the conventional digital radio communication system will be described below.

When frequency non-selective fading occurs in a space, a reception field strength decreases to generate errors in transmitted data. As a decrease in receiving field strength is large, an error rate increases. When the error rate exceeds a predetermined value, a carrier reproducing circuit of the demodulator or the tap control circuit of the equalizer are diverged. In this case, the demodulator is set in an asynchronous state, and the data signal is set in an interrupt state.

In the demodulator in the conventional digital radio communication system, an error rate alarm signal generated by a signal processing circuit is used as a circuit switching condition. When the error rate is equal to or larger than a predetermined threshold value before a data signal is set in an interrupt state, a current line is switched to a spare line. This threshold value is determined depending on a speed at which fading becomes deep or on the quality required in data transmission.

As described above, when an error occurs in the current line due to frequency non-selective fading, the current line is switched to the spare line before the data is set in an interrupt state. For this reason, line quality having an error rate lower than a predetermined error rate can be kept.

As fading occurring in a space, in addition to the frequency non-selective fading which decreases a reception field strength, a frequency selective fading which causes inter-code interference is known.

The operation of the demodulator in the conventional system when the frequency selective fading occurs will be described below.

The forward tap 14, the central tap 15, and the backward tap 16 in the decision equalizer 13 in FIG. 5 respectively adjust tap coefficients in accordance with the magnitude of inter-code interference to cancel out the inter-code interference. In this case, the backward tap 16 uses the determination signal 61 as its input signal. More specifically, the determination signal 61 is obtained by determining the equalized signal. Even when inter-code interference occurs in a signal which is not equalized, an original signal is faithfully reproduced, provided that an equalization residue is small. However, when the inter-code interference increases to exceed a threshold value, erroneous determination is performed. When this erroneous determination is performed, a determination error larger than the equalization residue is added to the original signal.

The above operation will be described with reference to FIG. 6.

Referring to FIG. 6, (a) represents a signal point in a binary phase-shift keying (BPSK) scheme, and (b) represents a received signal which receives small inter-code interference. In this case, since an equalization residue does not exceed a threshold value, a main signal determination circuit correctly determines an equalized signal to reproduce a transmitted signal. As a result, the equalization residue is completely removed. In FIG. 6, (c) represents a received signal which receives large inter-code interference. In this case, since an equalization residue exceeds the threshold value, the main signal determination circuit erroneously determines the equalized signal, and a large determination error occurs.

When large inter-code interference which causes the backward tap 16 to operate occurs, a backward tap coefficient has a large value, and a determination error occurs. The erroneous value adversely affects an output from the backward tap, and this value is fedback, thereby causing so-called erroneous propagation to occur. When the erroneous propagation occurs, errors continuously occur, and the tap control circuit or the like of the equalizer is immediately diverged. The divergence of the equalizer caused by this erroneous propagation is generated at a speed considerably higher than the divergence of a demodulator or equalizer caused by the decrease in reception field strength. For this reason, when an error alarm signal is generated, data is immediately set in an interrupt state, and data cannot be protected by a switching operation between lines in time.

SUMMARY OF THE INVENTION

It is an object of the present invention to provide a digital radio communication system having a demodulator in which a switching operation between lines can be performed in time even when abrupt frequency selective fading occurs.

In order to achieve the above object, according to the present invention, there is provided a digital radio communication system comprising a first demodulator for receiving a signal from a first antenna to output demodulated data and a line quality degradation signal, a second demodulator for receiving a signal from a second antenna to output demodulated data and a line quality degradation signal, a non-break switch for receiving the demodulated data output from the first and second demodulators and selecting and outputting one of the demodulated data, and a switching controller for receiving line quality degradation signals output from the first and second demodulators to output a switching control signal to the non-break switch on the basis of the received line quality degradation signals, wherein the first and second demodulators output the line quality degradation signals before the demodulated data are set in an interrupt state when abrupt frequency selective fading occurs.

When an alarm signal indicating the abnormal state of the equalizer is output such that a tap coefficient output from the forward tap exceeds a threshold value to output a forward tap alarm signal, or a tap coefficient output from the backward tap exceeds a threshold value to output a backward tap alarm signal, the signal is output as a line quality degradation signal. For this reason, even when abrupt frequency selective fading occurs in a current line, the current line can be switched to a spare line before data is interrupted.

DESCRIPTION OF THE PREFERRED EMBODIMENTS

Figure 1:
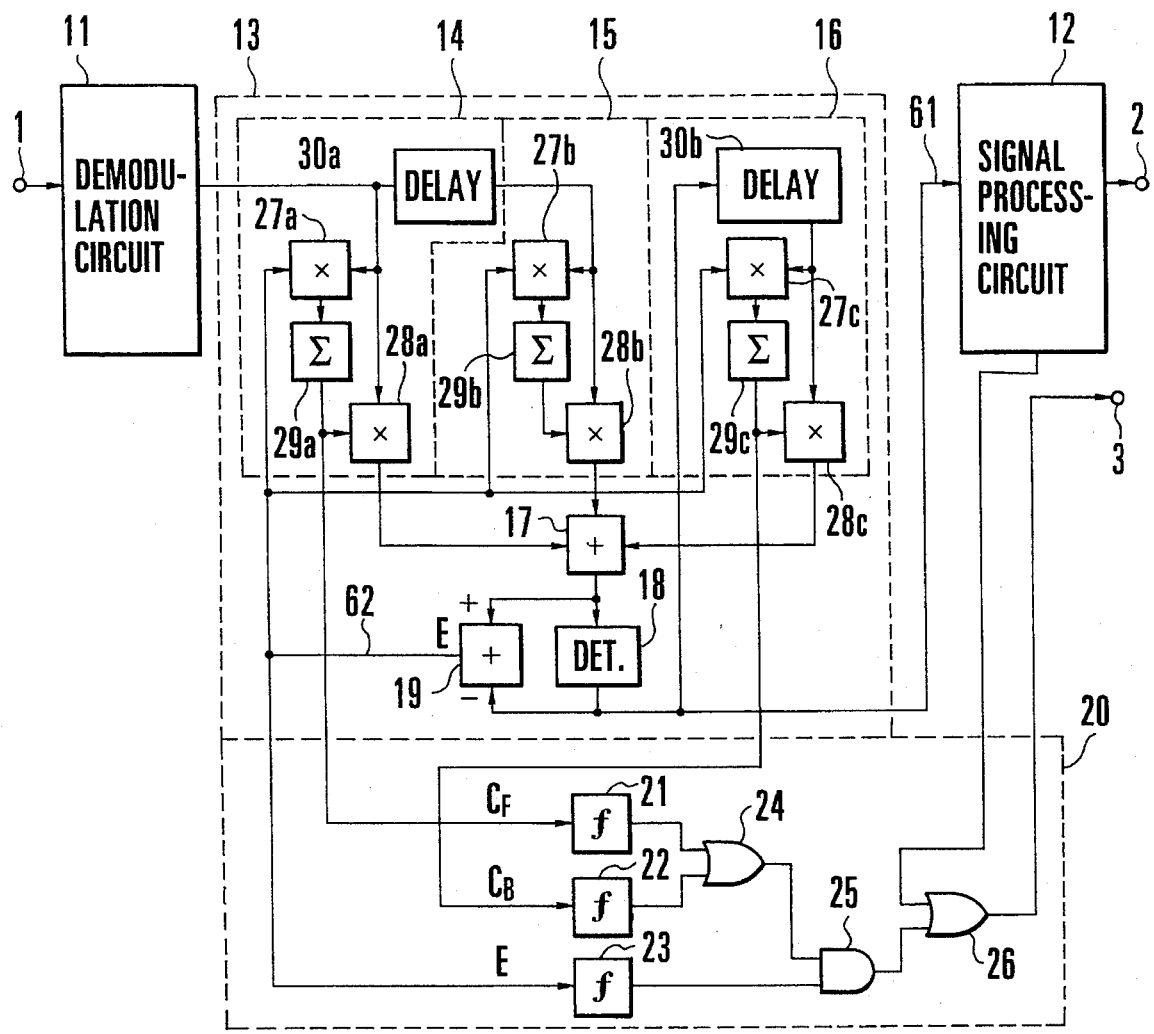
FIG. 1 is a block diagram showing a demodulator of an embodiment of the present invention.

FIG. 1 shows a demodulator in a digital radio communication system according to an embodiment of the present invention.

The present invention will be described below with reference to FIG. 1.

The demodulator in the digital radio communication system according to the present invention comprises a demodulation circuit 11, a signal processing circuit 12, a decision equalizer 13, and an alarm circuit 20. The same reference numerals as in FIG. 5 denote the same parts in FIG. 1, and a description thereof will be omitted.

An intermediate-frequency signal input from an input terminal 1 is demodulated by the demodulation circuit 11, and an inter-code interference component contained in the input digital signal is equalized by the decision equalizer 13, thereby generating a determination signal 61. In addition, the signal processing circuit 12 processes the determination signal 61 to reproduce data transmitted from a transmitting side. The transmitted data is output from an output terminal 2.

Figure 5:
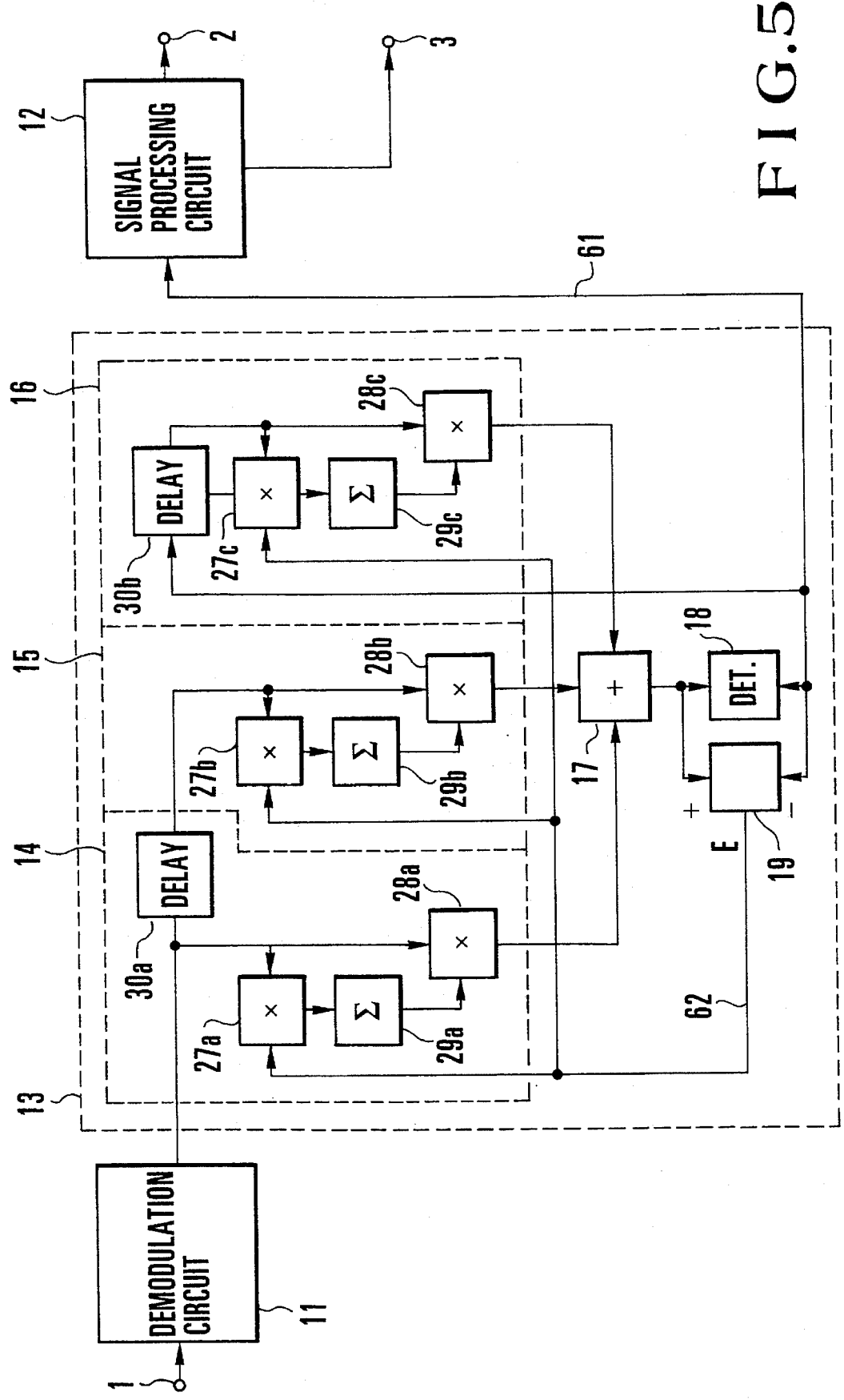
FIG. 5 is a block diagram showing a demodulator in a conventional digital radio communication system.
Figure 6:
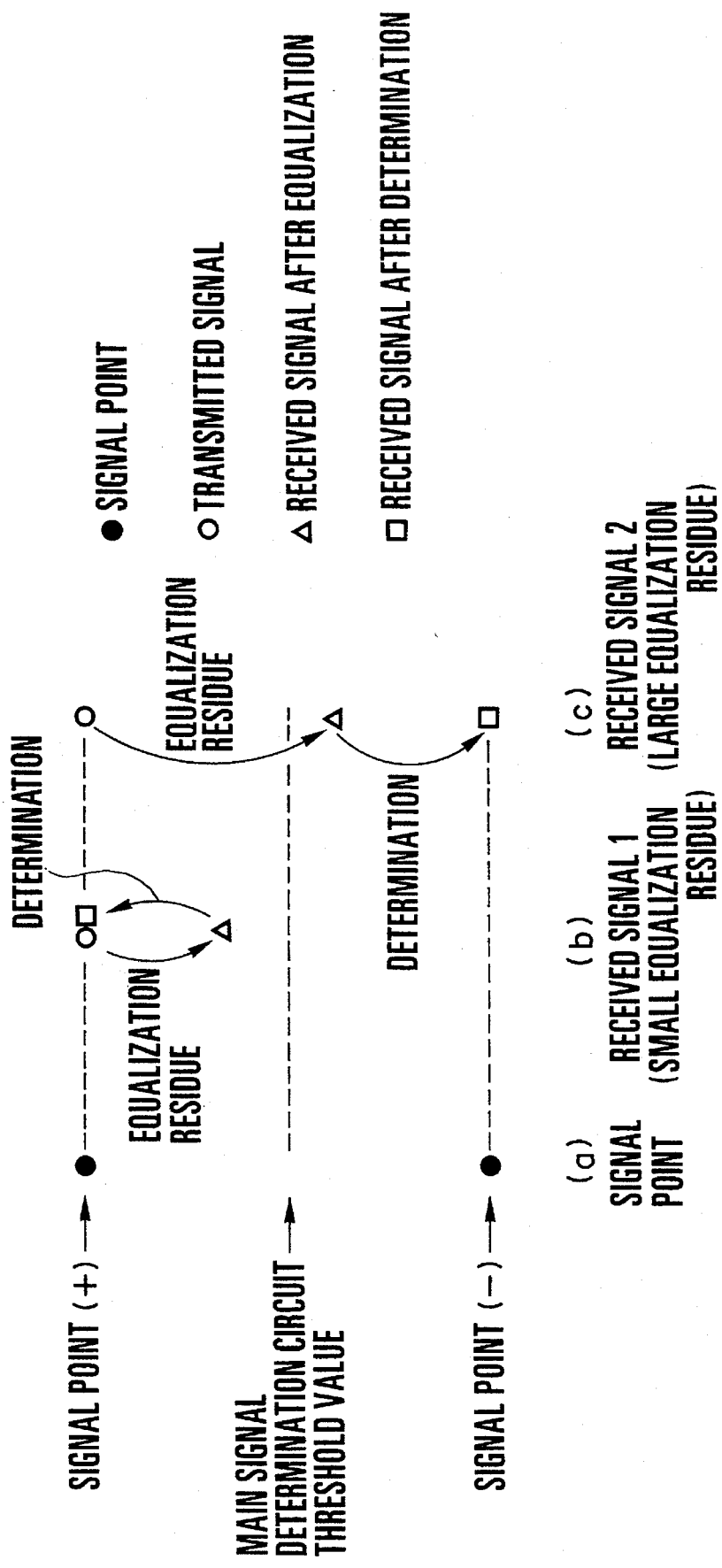
FIG. 6 is a view for explaining a signal point in a BPSK scheme and received signals depending on the magnitude of equalization residue, which signal point and received signals are used to explain FIG. 5.

FIG. 1 is different from FIG. 5 in that the alarm circuit 20 is arranged.

The alarm circuit 20 comprises a first determination circuit 21, a second determination circuit 22, a third determination circuit 23, a first OR circuit 24, a second OR circuit 26, and an AND circuit 25.

The first determination circuit 21 receives a forward tap coefficient CF output from a forward tap 14 of the decision equalizer 13 to monitor the forward tap coefficient CF for a predetermined period of time. When the average value of the forward tap coefficient CF exceeds a predetermined threshold value, the first determination circuit 21 outputs a forward tap alarm signal. The second determination circuit 22 receives a backward tap coefficient CB output from a backward tap 16 of the decision equalizer 13 to monitor the backward tap coefficient CB for a predetermined period of time. When the average value of the backward tap coefficient CB exceeds a predetermined threshold value, the second determination circuit 22 outputs a backward tap alarm signal. The third determination circuit 23 receives an error signal 62 (E) to monitor it for a predetermined period of time. When the average value of the error signal 62 exceeds a predetermined threshold value, the third determination circuit 23 outputs an error alarm signal.

The first OR circuit 24 receives the forward tap alarm signal output from the first determination circuit 21 and the backward tap alarm signal output from the second determination circuit 22 to output a logical OR signal therebetween.

The AND circuit 25 receives the logical OR signal output from the first OR circuit 24 and the error alarm signal output from the third determination circuit 23 to output an equalizer alarm signal serving as a logical AND signal between the logical OR signal output and the error alarm signal. The second OR circuit 26 receives an error rate alarm signal output from the signal processing circuit 12 and the equalizer alarm signal output from the AND circuit 25 to cause an alarm output terminal 3 to output, as a line quality degradation signal, the error rate alarm signal or the equalizer alarm signal serving as a logical OR signal therebetween.

Figure 2:
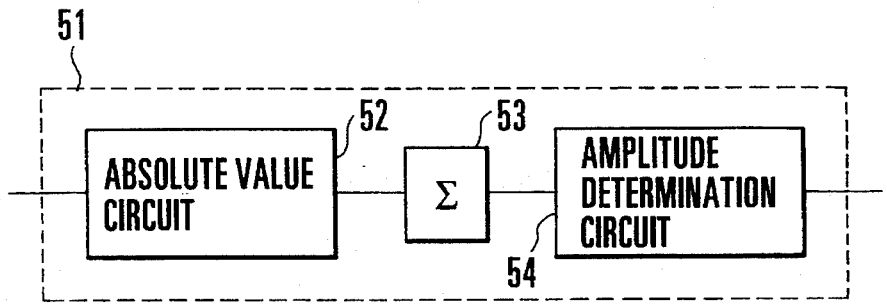
FIG. 2 is a block diagram showing a determination circuit in FIG. 1.

When the possible values of the tap coefficient and error signal of the equalizer are normalized to −1 or more and +1 or less, each of the determination circuits 21, 22, and 23 can constitute a determination circuit 51 shown in FIG. 2.

Referring to FIG. 2, an absolute value circuit 52 changes an input signal into an absolute value, and the average value of the absolute value is calculated by an averaging circuit 53 within a predetermined period of time. The signal of the averaged absolute value is input to an amplitude determination circuit 54, and the averaged absolute value is compared with a predetermined threshold value in the amplitude determination circuit 54. When the input signal exceeds the threshold voltage, an alarm signal is output. As the threshold value, a ½ value of an absolute value amplitude which is ½ a normalized value. In addition, a tap coefficient or an error signal has a value close to the threshold value. For this reason, in order to prevent outputting and releasing operations of the alarm signal from being repeated, the threshold value is set to be 0.6 in outputting the alarm signal, and the threshold value is set to be 0.5 in releasing the alarm signal. In this manner, hysteresis can be kept.

In this case, when inter-code interference larger than frequency selective fading occurs, a transversal filter operates to make the forward or backward tap coefficient large. However, while the inter-code interference is satisfactorily equalized, the error signal serving as an equalization residue is kept small. In this case, since no signal is output from the third determination circuit 23, the AND circuit 25 is kept disabled. Even when a signal is output from the first or second determination circuit 21 or 22, no signal is output from the AND circuit 25.

When the inter-code interference increases further, and the equalizer operates up to almost its limit, the tap coefficient and the error signal have large values. In this case, since a signal is output from the third determination circuit 23, the AND circuit 25 is enabled. When a signal is output from the first or second determination circuit 21 or 22, a signal is output from the AND circuit 25. More specifically, when both of the tap coefficient and the error signals are monitored, the limit of the equalizer can be detected.

In this manner, in the alarm circuit 20, when the error signal and at least one of the forward and backward tap coefficients exceed the threshold value, this state can be detected as an equalizer alarm signal.

In addition, when a reception field strength decreases due to frequency non-selective fading, an error occurs. When an error rate exceeds a threshold value, an error rate alarm signal is output from the signal processing circuit 12. These operations are the same as those of the prior art.

In the alarm circuit 20, the error rate alarm signal output from the signal processing circuit 12 is input to the second OR circuit 26, and the second OR circuit 26 calculates a logical OR signal between the error rate alarm signal and the equalizer alarm signal output from the AND circuit 25. When any one of these signals is generated, the signal is output from the alarm output terminal 3 as a line quality degradation signal.

Figure 4:
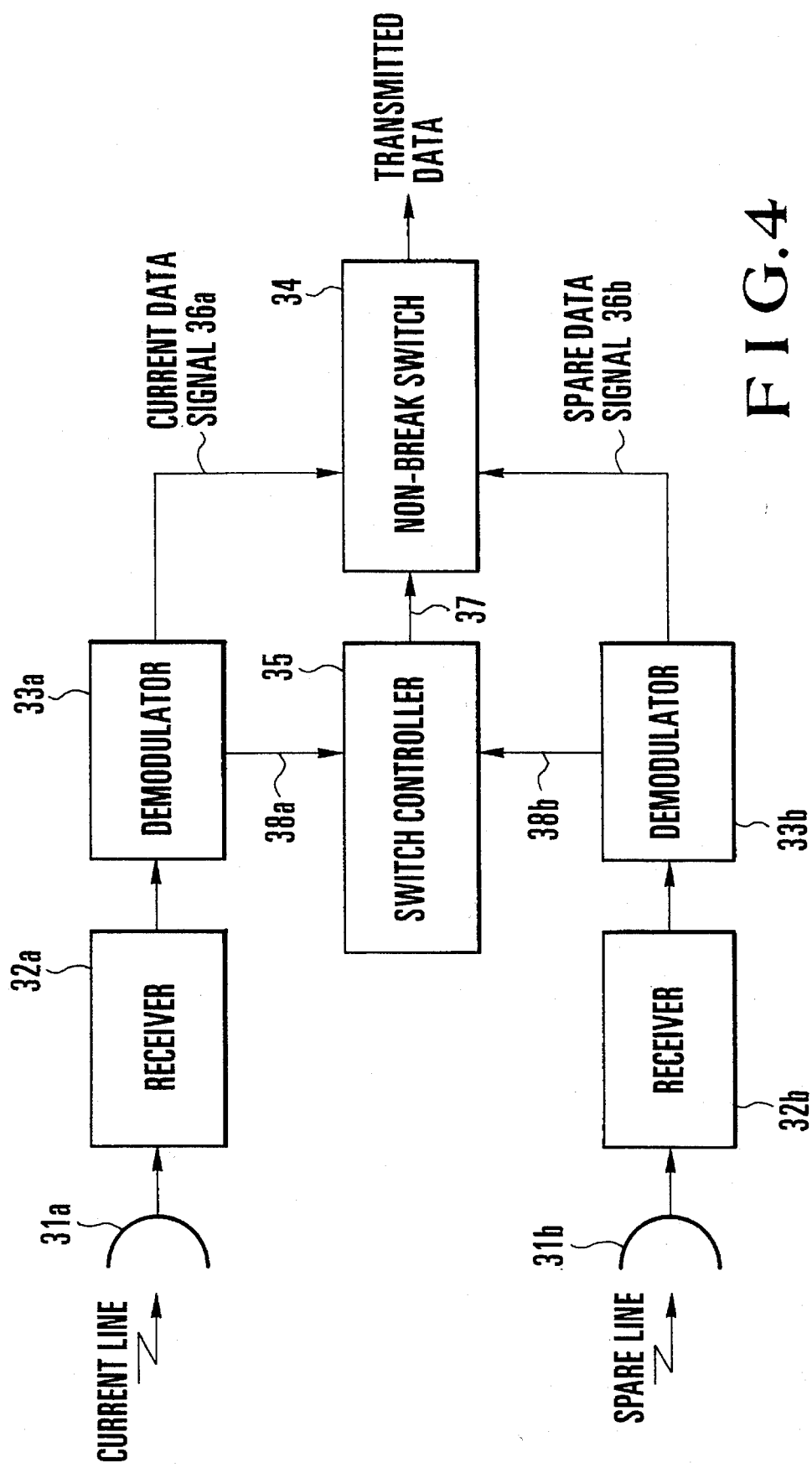
FIG. 4 is a block diagram showing a digital radio communication system having a current line and a spare line.

The demodulator described above is used in a digital radio communication system shown in FIG. 4. Referring to FIG. 4, when a failure occurs in a current line due to fading, a line quality degradation signal 38a is output from a demodulator 33a of the current line, and a non-break switch 34 switches a data signal from the current line to a spare line on the basis of the line quality degradation signal 38a. When fading is eliminated, and the line quality degradation signal 38a is not output from the demodulator 33a, the data signal is switched from the spare line to the current line, thereby setting the original state. These operations are the same as those described in the prior art.

In the above embodiment, a BPSK scheme is described for descriptive convenience. However, the present invention can also be applied to a multi-value quadrature modulation scheme using a two-dimensional modulator, as in the BPSK scheme.

Figure 3:
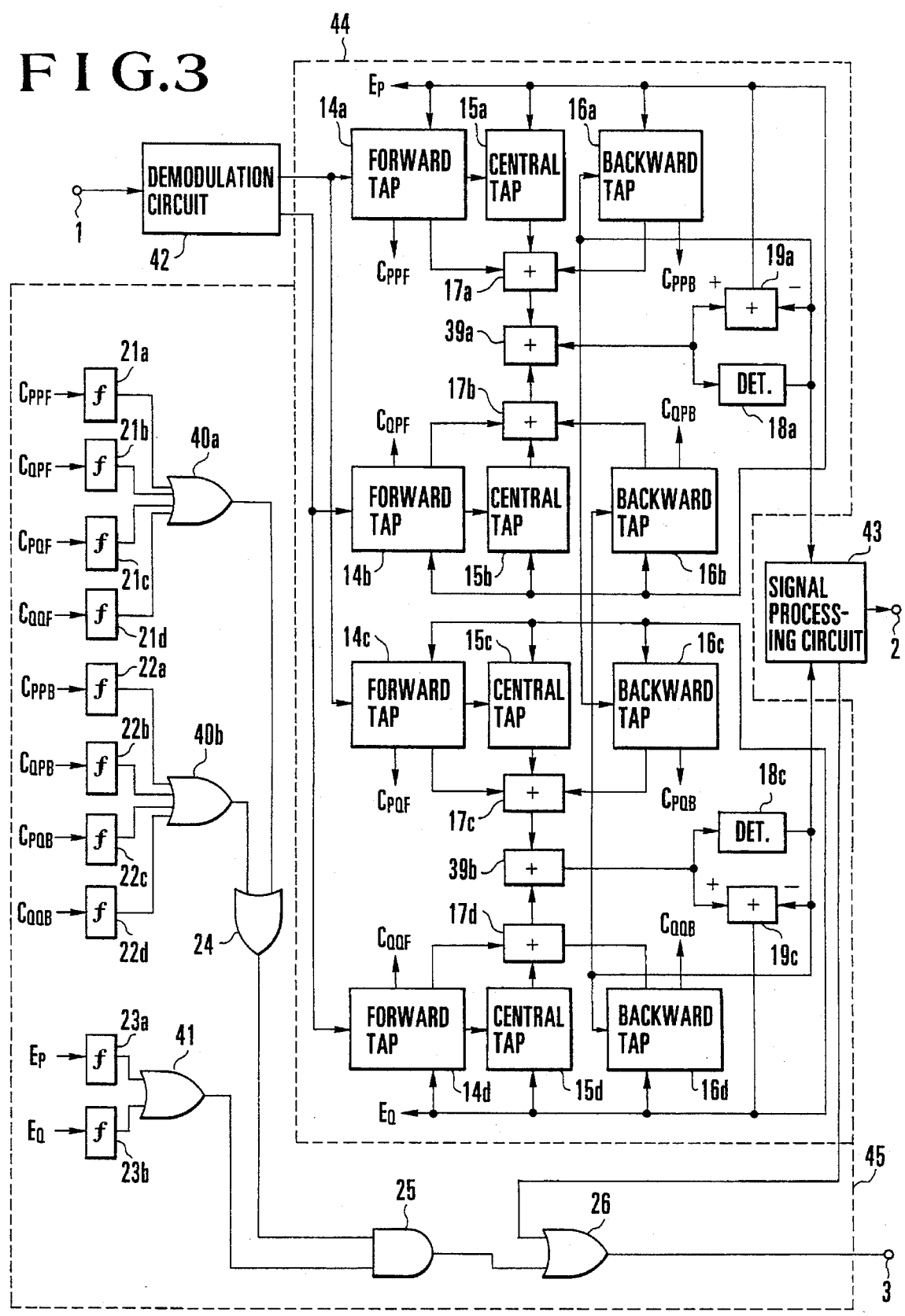
FIG. 3 is a block diagram showing a demodulator in another embodiment in which the present invention is applied to a two-dimensional arrangement.

FIG. 3 shows an embodiment in which the present invention is applied to a two-dimensional demodulator. An intermediate-frequency signal input to an input terminal 1 is quadrature-modulated by a demodulation circuit 42, thereby outputting the signal as two-channel (P-channel and Q-channel) digital signals. A decision equalizer 44 receives the two-channel digital signals and equalizes the digital signals in a two-dimensional (in-phase/quadrature) state. The two-channel determination signals are input to a signal processing circuit 43 and output from an output terminal 2 as a data signal obtained by mixing the two-channel determination signals.

In the decision equalizer 44, circuits except for adders 39a and 39b for adding an equalized in-phase signal and an equalized quadrature signal can be constituted by the circuits in the one-dimensional decision equalizer shown in FIG. 1. Reference numerals 14a, 14b, 14c, and 14d denote forward taps; 15a, 15b, 15c, and 15d, central taps; 16a, 16b, 16c, and 16d, backward taps; 17a, 17b, 17c, and 17d, adders; 18a, 18b, 18c, and 18d, main signal determination circuits; and 19a, 19b, 19c, and 19d, subtracters.

In an alarm circuit 45, circuits except for 4-input OR circuits 40a and 40b for calculating logical OR signals of a total of four two-channel, two-dimensional forward taps ($C_{PPF}$, $C_{QPF}$, $C_{PQF}$, and $C_{QQF}$), a total of four two-channel, two-dimensional backward taps ($C_{PPB}$, $C_{QPB}$, $C_{PQB}$, and $C_{QQB}$) and an OR circuit 41 for calculating a logical OR signal between the determination values of two-channel error signals ($E_P$ and $E_Q$) can be constituted by the circuits used in the one-dimensional alarm circuit described in FIG. 1. Reference numerals 21a, 21b, 21c, and 21d denote first determination circuits; 22a, 22b, 22c, and 22d, second determination circuits; and 23a and 23b, third determination circuits.

The operations of the circuits in FIG. 3 are the same as those of the circuit in FIG. 1, and a description thereof will be omitted.

In the above embodiment, a decision equalizer having a simple structure having one forward tap and one backward tap has been described as an equalizer. However, the number of taps is not limited to the above embodiment, and a linear equalizer can be used in place of the decision equalizer.

As has been described above, according to the present invention, the digital radio communication system can cope with not only frequency non-selective fading as in a conventional digital radio communication system, but also an abrupt frequency selective fading, so that a current line can be switched to a spare line before demodulated data is interrupted.

In addition, a logical OR signal between an equalizer alarm signal from a decision equalizer and an error rate square signal from a signal processing circuit is used as a line quality degradation signal. For this reason, even when fading occurs, the line quality degradation signal can be output using a simple arrangement before data is interrupted. As a result, switching between lines can be performed before transmitted data is interrupted, and line quality having a predetermined error rate or less can be kept.

What is claimed is:

1. A digital radio communication system comprising:
   a first demodulator for receiving a signal from a first antenna to output demodulated data and a line quality degradation signal;
   a second demodulator for receiving a signal from a second antenna to output demodulated data and a line quality degradation signal;
   a non-break switch for receiving the demodulated data output from said first and second demodulators and selecting and outputting one of the demodulated data; and
   a switching controller for receiving line quality degradation signals output from said first and second demodulators to output a switching control signal to said non-break switch on the basis of the received line quality degradation signals,
   wherein said first and second demodulators each comprises alarm circuit means for respectively outputting the line quality degradation signals before the demodulated data are set in an interrupt state when abrupt frequency selective fading occurs.

2. A system according to claim 1, wherein each of said first and second demodulators comprises
   a demodulation circuit for receiving a modulated signal, for demodulating the modulated signal to a digital signal in a baseband range, and for outputting the digital signal,
   a decision equalizer, constituted by a forward tap, a central tap, and a backward tap, for receiving said digital signal from said demodulation circuit to output a determination signal,
   a signal processing circuit for receiving the determination signal from said decision equalizer to output a data signal and an error rate alarm signal, and
   said alarm circuit means, wherein said alarm circuit means detects an abnormal state of said decision equalizer and an abnormal state of an error rate of the data signal, and the alarm circuit means outputs the line quality degradation signal upon detecting either the abnormal state of said decision equalizer or the abnormal state of the error rate.

3. A system according to claim 2, wherein said alarm circuit means comprises
   a first determination circuit for receiving a forward tap coefficient output from said forward tap to output a forward tap alarm signal when the received forward tap coefficient exceeds a predetermined value,
   a second determination circuit for receiving a backward tap coefficient output from said backward tap to output a backward tap alarm signal when the received backward tap coefficient exceeds a predetermined value,
   a third determination circuit for receiving an error signal output from the decision equalizer and outputting an error alarm signal when the error signal exceeds a predetermined threshold value, a first OR circuit for receiving the forward tap alarm signal and the backward tap alarm signal to output a logical OR signal between the forward tap alarm signal and the backward tap alarm signal, an AND circuit for receiving an output from said first OR circuit and the error alarm signal to output an equalizer alarm signal, and a second OR circuit for receiving the equalizer alarm signal and the error rate alarm signal output from said signal processing circuit to output, as the line quality degradation signal, a logical OR signal between the error rate alarm signal and the equalizer alarm signal.

4. A system according to claim 2, wherein said decision equalizer comprises an adder for adding outputs from said forward tap, said central tap, and said backward tap to output an equalized signal, a main signal determination circuit for receiving the equalized signal output from said adder to output the determination signal, and a subtracter for receiving the equalized signal and the determination signal and calculating a difference between the equalized signal and the determination signal to output the difference as an error signal.

5. A system according to claim 4, wherein said forward tap is constituted by a circuit for receiving the error signal and the digital signal demodulated by said demodulation circuit to output a forward equalization signal and a forward tap coefficient on the basis of the digital signal and the error signal, said central tap is constituted by a circuit for receiving the error signal and a delay signal obtained by delaying the digital signal to output a central equalization signal on the basis of the delay signal and the error signal, and said backward tap is constituted by a circuit for receiving the determination signal and the error signal to output a backward equalization signal and a backward tap coefficient on the basis of the determination signal and the error signal.

6. A system according to claim 1, wherein each of said first and second demodulators comprises a demodulation circuit for receiving a signal and to demodulate the signal to a digital signal in a baseband range, a decision equalizer, constituted by a forward tap, a central tap, and a backward tap, for receiving a demodulated output from said demodulation circuit to output a determination signal and causing at least one of said forward and backward taps to output a tap coefficient, a signal processing circuit for receiving the determination signal from said decision equalizer to output a data signal and an error rate alarm signal, and wherein the alarm circuit means for outputting the line quality degradation signal when a tap coefficient output from said forward or backward tap of said decision equalizer exceeds a predetermined value, or the error rate alarm signal is output.

* * * * *